United States Patent [19]

Taylor

[11] 4,440,972
[45] Apr. 3, 1984

[54] MINIATURIZED BUS BAR WITH CAPACITORS AND METHOD OF MAKING SAME

[75] Inventor: Michael J. Taylor, Mesa, Ariz.

[73] Assignee: Rogers Corporation, Rogers, Conn.

[21] Appl. No.: 249,394

[22] Filed: Mar. 31, 1981

[51] Int. Cl.³ .................. H01B 7/00; H01B 13/00
[52] U.S. Cl. .................... 174/72 B; 29/854
[58] Field of Search ............ 174/68 B, 70 B, 72 B; 29/825, 854, 855, 856, 25.42; 264/272.14, 272.18; 361/303, 304, 306, 321, 328, 329, 330

[56] References Cited

U.S. PATENT DOCUMENTS

| | | | |
|---|---|---|---|
| 4,236,046 | 11/1980 | DeVries | 174/72 B |
| 4,266,091 | 5/1981 | Fukuda | 174/72 B |
| 4,346,257 | 8/1982 | Moss et al. | 174/72 B |

*Primary Examiner*—Laramie E. Askin
*Attorney, Agent, or Firm*—David S. Fishman

[57] ABSTRACT

A novel method of assembling miniaturized bus bars is presented wherein capacitor ribbons are formed having discrete capacitive elements retained within an insulating layer. These capacitor ribbons are positioned between a pair of bus bar conductor plates with the capacitive elements placed in electrical contact with the plates. The ribbon and bus bar conductor plates are retained together by any conventional technique.

13 Claims, 5 Drawing Figures

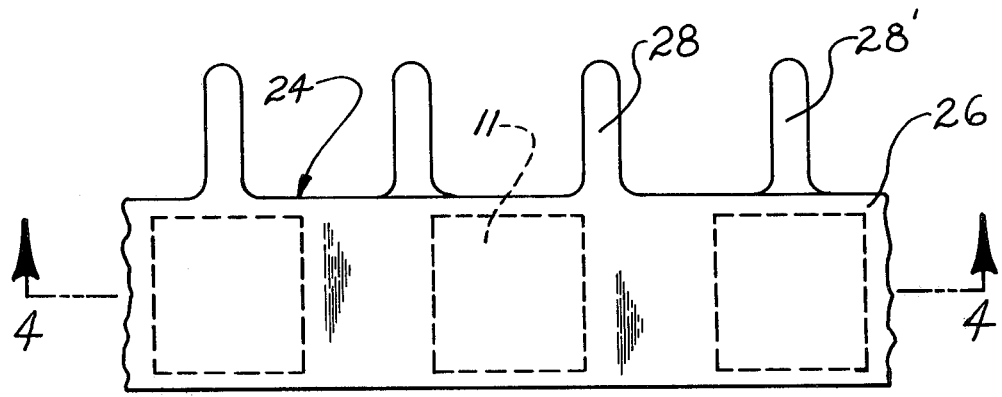
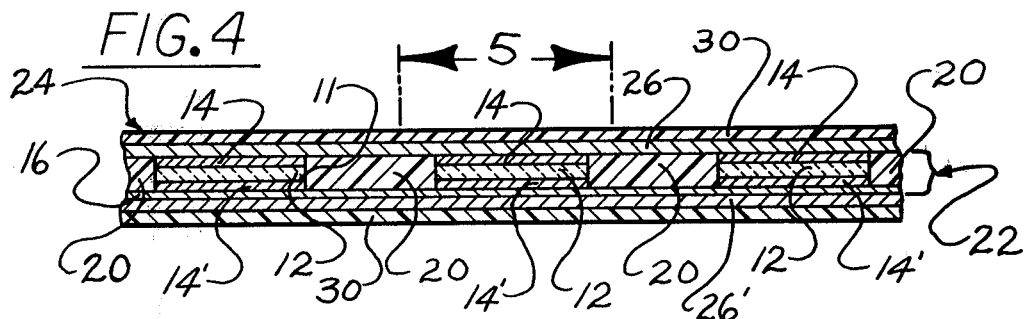
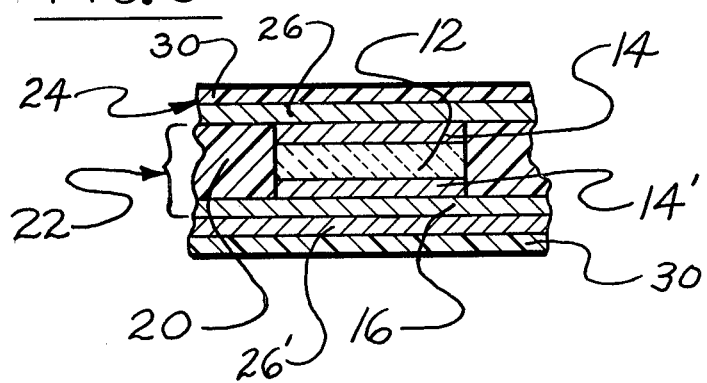

MINIATURIZED BUS BAR WITH CAPACITORS AND METHOD OF MAKING SAME

BACKGROUND OF THE INVENTION (1) Field of the Invention

This invention relates to bus bars, especially relatively small or miniature bus bars. More particularly, this invention relates to multilayer bus bar assemblies, and the method of manufacture thereof, wherein the bus bar assembly incorporates capacitive elements between layers of bus conductors to provide high capacitance bus bars.

(2) Description of the Prior Art

Conventional bus bars of relatively small or miniature size have been known in the art for a number of years. Such bus bar devices are used for power and/or signal distribution in many systems, such as, for example, computer back panels and integrated circuit systems. Such prior art multilayer bus bars comprise at least two conductive plates (usually in the form of elongated strips or bars of copper) separated by an insulating film. A typical prior art bus bar of this type may use copper conductors having a thickness of about 10 mils, and the overall dimensions of the bus bar may be from about 0.019 to 0.120 inch thick, from about 0.150 to 0.200 inch wide and range in length up to about 16 inches. Typically, the separating insulating layer is a plastic dielectric film such as the polyester material known as MYLAR. The MYLAR separator layer and the conductive plates are bonded together by an adhesive. Conventional prior art bus bars of this type have relatively low capacitance which results in the devices being comparatively ineffective in attenuating high frequency noise. This high frequency noise is highly undesirable, especially when the bus bar is used for signal distribution.

One prior art approach to eliminating this noise problem involves connecting capacitors to the bus bar after the completion of the bus bar assembly. While this approach raised the capacitance and minimized the noise, it resulted in additional expense and time in manufacturing.

Another type of bus bar structure disclosed in the prior art involves disposing discrete high capacitive elements between a pair of conductors. These bus bars have the desired high capacitance. Examples of such high capacitance bus bars are disclosed in U.S. Pat. Nos. 4,236,038 and 4,236,046 and in Patent Application Ser. No. 950,266, filed Oct. 10, 1978, now U.S. Pat. No. 4,266,091, all of which are owned by the assignee of the present invention. The high capacitive elements utilized in those inventions are thin layers or chips of dielectric material, usually a ceramic with a high dielectric constant. The opposing surfaces of the chips are typically coated with a thin, integral and continuous film of conductive material and these conductive films are electrically connected to respective ones of the bus conductors.

SUMMARY OF THE INVENTION

The present invention overcomes the above discussed disadvantages and other deficiencies of the prior art by providing novel and improved structures for and methods of constructing miniaturized bus bars which have a high capacitance.

In accordance with the present invention a miniaturized bus bar assembly is constructed by forming a capacitor ribbon with discrete capacitive elements retained within an insulating layer. This capacitor ribbon is formed by a process which starts by arranging plural capacitive elements on a supporting surface. The capacitive elements and support are then placed within a frame and a potting compound is poured into the frame. The potting compound surrounds the capacitive elements but does not cover them. The potted capacitor array is removed from the frame, cut to define capacitor "ribbons" and a ribbon is then positioned between a pair of bus bar conductors with the plates of the capacitive elements in electrical contact with the bus conductors. The capacitor ribbon and the bus bar conductors are retained together by any conventional technique.

Accordingly, the present invention has as one of its numerous objects novel apparatus for and methods of producing miniaturized bus bar assemblies.

BRIEF DESCRIPTION OF THE DRAWING

The present invention may be better understood and its numerous objectives and advantages will be apparent to those skilled in the art by reference to the accompanying drawings, wherein like reference numerals refer to like elements in the several Figures, and in which:

FIG. 3 is a partial top plan view of a bus bar in accordance with the present invention.

FIG. 4 is a cross-sectional side elevation view taken along line 4—4 of FIG. 3.

FIG. 5 is an enlarged detail of section 5 of FIG. 4.

DESCRIPTION OF THE PREFERRED EMBODIMENT

Figure 1:
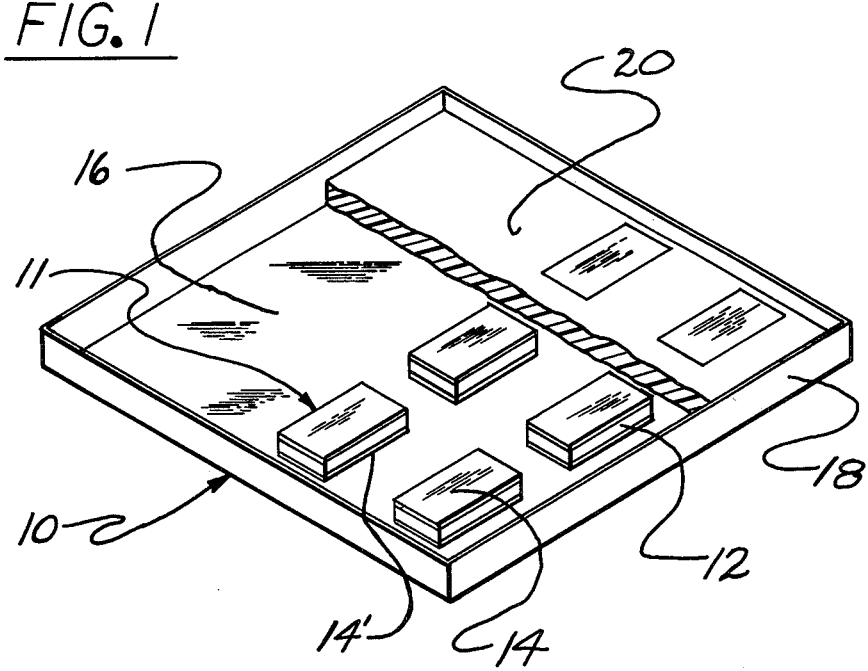
FIG. 1 is a perspective view, partly broken away, depicting a method of forming capacitor ribbons according to the present invention.

Referring to FIG. 1, apparatus for use in forming capacitor ribbons in accordance with the present invention is indicated generally at 10. Capacitive elements 11 are positioned in a series of linear arrays upon a support 16. Capacitive elements 11 are defined by ceramic chips 12 which have metallized surfaces; i.e., conductive layers 14 and 14' are deposited upon opposing surfaces of chips 12. Ceramic chips 12 are comprised of a ceramic material which has a high dielectric constant, preferably a dielectric constant in excess of 8,000. A ceramic material that may be used in the practice of the present invention is barium titanate. Ceramic chips 12 have a thickness ranging from about 0.005 inch to about 0.015 inch with the opposed face surfaces having dimensions in the range of from about 0.2 inch by 0.2 inch to about 0.2 inch by 3.0 inches for individual chips. The chips 12 may extend for the length of the bus bar assembly to be produced if provided in the form of ribbon capacitors. Conductive layers 14 and 14' may be formed by any conventional technique, such as by bonding conductive foils to the opposing faces of chip 12 or depositing a conductive layer such as silver upon opposing surfaces of chip 12. In accordance with the preferred embodiment, support 16 may be any conductive material, preferably a copper foil.

Continuing to discuss FIG. 1, a sheet or substrate of conductive foil 16 is placed within a frame 18. Capacitive elements 11 are then bonded to conductive foil 16, by any conventional technique, such as by soldering or using a conductive adhesive. The method used to bond capacitive elements 11 to conductive foil 16 must assure electrical contact between conductive foil 16 and the adjacent conductive layer 14'. The capacitor elements 11 are arranged on foil 16 in multiple rows as shown in FIG. 1.

Conductive foil 16 and capacitive elements 11 are then potted within frame 18. The dimensions of frame 18 are only limited to the size of conductive foil 16 and the arrangement of capacitive elements 11. Frame 18 is filled with insulating material 20. Insulating material 20 is a shearable, non-brittle electrical insulation which by way of example may be Goodyear VPE-5571, a thermoplastic polyester, amide cured epoxy or other commercially available potting compounds having similar characteristics. Enough insulating material 20 is poured into frame 18 so that capacitive elements 11 are fully surrounded but the upper conductive layer 14 of each capacitor is left exposed. The insulating material 20 is then cured and frame 18 is removed. The insulating material 20 is then cut or sheared by any conventional technique to form strips or ribbons of insulating material 20 with embedded capacitive elements 11 as shown in FIG. 2.

Figure 2:
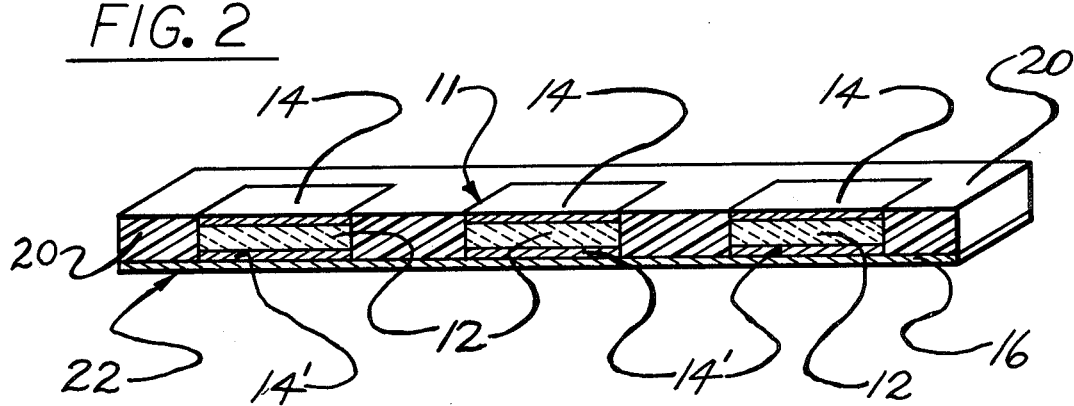
FIG. 2 is a cross-sectional perspective view of a capacitor ribbon formed according to the present invention.

With reference now to FIG. 2, a capacitor strip or ribbon 22 having insulating material 20 with capacitive elements 11 embedded therein is shown. Capacitor ribbon 22 has a discrete number of capacitive elements 11 with one face having exposed conductive layers 14 and the opposing face having conductive foil 16. This capacitor ribbon 22 is used to form a miniaturized bus bar assembly in accordance with the present invention.

Referring to FIGS. 3 and 4, a miniaturized bus bar assembly is indicated generally at 24. This bus bar assembly 24 incorporates the capacitor ribbon 22 with the capacitive elements 11 between two bus conductors 26 and 26'. These bus conductors are copper elements which may be tin plated. The conductors 26 and 26' are approximately 10 mils thick and range in width or height from about 0.150 to about 0.200 inch and range in length from about 2 to about 16 inches, depending upon the particular application intended for the bus bar. The bus conductors 26 and 26' are provided with distribution prongs or fingers 28,28'. Distribution prongs or fingers 28,28' are used to distribute electrical current or signals. The capacitor ribbon 22 is secured between the bus conductors 26 by any known method which insures that the conductive layer 14 and conductive foil 16 are placed in electrical contact with the adjacent respective bus conductors 26. A plastic layer 30 may be added to insulate the outer surface of each bus conductor 26,26', or the entire assembly may be encapsulated in an insulating plastic.

Referring now to FIG. 5, the laminated construction of the bus bar assembly 24 prepared according to one embodiment of the present invention is seen in enlarged detail. Capacitor ribbon 22 is secured between bus conductors 26 and 26' by any material or technique which mechanically and electrically connects the conductive layer 14 and conductive foil 16 to the adjacent respective bus bar conductors 26 and 26'. Materials that may be used for this purpose are conductive adhesives or solder.

In an alternative assembly technique, the conductive support 16 of FIG. 1 can be replaced by any other suitable support from which the embedded array of capacitors will be released after the potting step. In this alternative approach, the opposite plates 14 and 14' of each capacitor in the ribbon will be directly bonded to the adjacent bus conductor.

While the preferred embodiments have been shown and described, various modifications and substitutions may be made thereto without departing from the spirit and scope of the invention. Accordingly, it must be understood that the present invention has been described by way of illustration and not limitation.

What is claimed is:

1. A high capacitance multilayer bus bar assembly comprising:
   a pair of spatially separated conductors, said conductors having inwardly facing planar surfaces;
   capacitor ribbon means positioned between said conductors, said ribbon means having a pair of outwardly facing planar surfaces, said ribbon means comprising a plurality of spatially separated discrete capacitors embedded within an insulating material, said capacitors each having a pair of oppositely disposed planar conductive surfaces, said conductive surfaces being exposed at and in part defining said planar surfaces of said ribbon means, said conductive surfaces being electrically connected to respective of said conductor inwardly facing surfaces;
   an elongated electrically conductive strip, said strip being affixed to at least one of said ribbon means planar surfaces, said strip being in electrical contact with said conductive surfaces of said capacitors at said one planar surface and with the inwardly facing surface of the adjacent one of said conductors; and
   means for retaining said capacitor conductive surfaces electrically connected to said respective conductor inwardly facing surfaces.

2. The assembly of claim 1 wherein said retaining means comprises:
   conductive adhesive, said conductive adhesive being in intimate contact with said capacitor conductive surfaces and said conductor surfaces, said conductive adhesive bonding said ribbon means to said conductors.

3. The assembly of claim 1 wherein said capacitors are linearly arranged in said ribbon means and are each comprised of a flat ceramic wafer, two opposed surfaces of said wafers being metallized to form said planar conductive surfaces.

4. The assembly of claim 3 wherein each said ceramic wafer has a dielectric constant in excess of 8,000.

5. The assembly of claim 1 wherein said capacitors are linearly arranged in said ribbon means and are each comprised of a flat ceramic wafer between said planar conductive surfaces, said planar conductive surfaces being coated with a layer of conductive adhesive.

6. The assembly of claim 5 wherein each said ceramic wafer has a dielectric constant in excess of 8,000.

7. The assembly of claim 1 wherein said capacitors have a dielectric constant in excess of 8,000.

8. The assembly of claim 7 wherein said insulating material is a shearable, non-brittle material.

9. The assembly of claim 1 wherein said insulating material is selected from the group consisting of:
   a thermoplastic polyester; and
   amide cured epoxy.

10. The assembly of claim 1 wherein said insulating material is a shearable, non-brittle material.

11. A method of forming a high capacitance bus bar assembly comprising the following steps:

selecting a plurality of substantially identical capacitive elements each comprising a wafer of dielectic material with a pair of conductively coated opposed surfaces;

positioning a substrate within a frame;

arranging the capacitive elements in a linear array upon the substrate with one of said conductively coated surfaces of each capacitive element facing the substrate and the other of said conductively coated surfaces facing upward;

filling the frame with a curable electrical insulating material in uncured form to a level where the insulating material surrounds the capacitive elements with the upward facing conductively coated surfaces of the capacitive elements being free of the insulating material;

preventing the insulating material from covering the conductively coated surfaces of the capacitive elements;

curing the insulating material;

removing the frame;

shearing the insulating material to form a strip having a linear array of capacitive elements embedded therein; and securing the strip between a pair of bus bar conductors with the conductive coated surfaces of the capacitive elements being electrically connected to respective of the bus bar conductors.

12. The method of claim 11 wherein the step of positioning a substrate within the frame includes:

positioning a conductive foil substrate in the frame.

13. The method of claim 12 further including the step of:

bonding the capacitive elements to the conductive foil, the foil subsequently forming a part of the sheared strip.

* * * * *